(12) United States Patent  (10) Patent No.: US 6,474,862 B2
Farrell                    (45) Date of Patent:    Nov. 5, 2002

(54) APPARATUS FOR MAKING FROZEN DRINKS

(76) Inventor: James J. Farrell, 25 Van Tassel La., Orinda, CA (US) 94563

( * ) Notice: Subject to any disclaimer, the term of this patent is extended or adjusted under 35 U.S.C. 154(b) by 0 days.

(21) Appl. No.: 10/010,313

(22) Filed: Nov. 13, 2001

(65) Prior Publication Data

US 2002/0131324 A1 Sep. 19, 2002

Related U.S. Application Data

(62) Division of application No. 08/866,548, filed on May 30, 1997.

(51) Int. Cl.$^7$ .............................. B01F 7/26; B01F 15/02
(52) U.S. Cl. .................... 366/147; 366/147; 366/168.1; 366/207; 366/289; 366/316
(58) Field of Search ............................... 366/147, 207, 366/203, 168.1, 289, 316, 199, 197; 99/287

(56) References Cited

U.S. PATENT DOCUMENTS

| 496,674 A | 5/1893 | Urbach |
| 934,537 A | 9/1909 | Johnson |
| 1,313,830 A | 8/1919 | Minsk |
| 1,560,826 A | * 11/1925 | Kirschbraun ............. 366/168.1 |
| 1,847,226 A | * 3/1932 | Ringwald .................... 366/207 |
| 1,911,202 A | * 5/1933 | Nielsen ....................... 366/207 |
| 1,913,210 A | * 6/1933 | Parker ......................... 366/207 |
| 2,003,259 A | * 5/1935 | Gilbert et al. .............. 366/207 |
| 2,012,486 A | * 8/1935 | Strauss ....................... 366/199 |
| 2,026,240 A | 12/1935 | Luxmore |
| 2,031,770 A | * 2/1936 | Gilbert et al. .............. 366/199 |
| 2,072,691 A | 3/1937 | Stark .............................. 99/60 |
| 2,115,809 A | 5/1938 | Goldman |
| 2,667,423 A | 1/1954 | Simpson ...................... 99/171 |
| 2,668,765 A | 2/1954 | Simpson ........................ 99/55 |
| 2,701,131 A | 2/1955 | Love |
| 2,863,776 A | 12/1958 | Lisher |
| 2,898,094 A | 6/1959 | O'Neill, Jr. |
| 2,941,885 A | 6/1960 | Tomlinson |
| 2,967,433 A | 1/1961 | Phillips |
| 3,154,123 A | 10/1964 | Tomlinson |
| 3,171,635 A | 3/1965 | Haentjens et al. |
| 3,295,997 A | 1/1967 | Tomlinson ................... 99/275 |
| 3,365,304 A | 1/1968 | Guterman et al. .......... 426/565 |
| 3,503,757 A | 3/1970 | Rubenstein .................. 99/136 |
| 3,514,080 A | 5/1970 | Price et al. |
| 3,647,472 A | 3/1972 | Speech et al. ................. 99/34 |
| 3,665,722 A | 5/1972 | Cornelius ....................... 62/68 |

FOREIGN PATENT DOCUMENTS

DE     2158002    5/1973

OTHER PUBLICATIONS

Arbuckle, "Ice Cream," 3$^{rd}$ Edition pp. 54–55, 323–331, 1977.

Product literature for Hamilton Beach Models 936 P and 908. 1992.

Hamilton Beach Promotional Material. 4/92.

Primary Examiner—Tony G. Soohoo
(74) Attorney, Agent, or Firm—Kinney & Lange, P.A.

(57) ABSTRACT

The present invention is a frozen drink machine and a method for making frozen drinks from a frozen substance which has been frozen into a block. According to the method of the present invention, a block of frozen substance is held in a vessel while a rotatable blade having features for grinding the frozen substance, and if desirable, for aerating the ground frozen substance, acts on the block, grinding the frozen substance while a heated liquid is simultaneously introduced into the vessel. An apparatus according to the present invention supports a cup containing the frozen substance, and includes a rotatable blade which is lowered into the cup and means for pumping a heated liquid into the cup.

53 Claims, 13 Drawing Sheets

U.S. PATENT DOCUMENTS

| | | | |
|---|---|---|---|
| 3,738,619 A | 6/1973 | Shirae | 259/108 |
| 3,889,002 A | 6/1975 | Clausi et al. | 426/576 |
| 3,922,361 A | 11/1975 | Vann | 426/599 |
| 3,939,001 A | 2/1976 | Clausi et al. | 106/136 |
| 3,949,098 A | 4/1976 | Bangert | 426/324 |
| 4,096,893 A | 6/1978 | Harvey, Jr. et al. | 141/90 |
| 4,169,681 A | 10/1979 | Kato | 366/244 |

(List continued on next page.)

| | | | |
|---|---|---|---|
| 4,297,379 A | 10/1981 | Topalian et al. | 426/565 |
| 4,358,298 A | 11/1982 | Ratcliff | 55/185 |
| 4,431,682 A | 2/1984 | Smith et al. | 426/565 |
| 4,434,186 A | 2/1984 | Desia et al. | 426/565 |
| 4,542,035 A | 9/1985 | Huang et al. | 426/565 |
| 4,544,277 A | 10/1985 | Schnellmann | 366/78 |
| 4,547,076 A | 10/1985 | Maurer | 366/244 |
| 4,609,561 A | 9/1986 | Wade et al. | 426/565 |
| 4,708,487 A | 11/1987 | Marshall | 366/206 |
| 4,818,554 A | 4/1989 | Giddey et al. | 426/564 |
| 4,828,866 A | 5/1989 | Wade et al. | 426/599 |
| 4,830,868 A | 5/1989 | Wade et al. | 426/565 |
| 4,842,884 A | 6/1989 | Bookwalter et al. | 426/585 |
| 4,983,412 A * | 1/1991 | Hauslein | 99/287 |
| 4,988,529 A | 1/1991 | Nakaya et al. | 426/569 |
| 5,000,974 A | 3/1991 | Albersmann et al. | 426/564 |
| 5,112,626 A | 5/1992 | Huang et al. | 426/43 |
| 5,114,045 A | 5/1992 | Herpe | 222/105 |
| 5,150,967 A | 9/1992 | Nelson et al. | 366/206 |
| 5,328,263 A | 7/1994 | Neilson | 366/254 |
| 5,439,289 A | 6/1995 | Neilson | 366/207 |
| 5,599,103 A | 2/1997 | Linscott | 366/343 |
| 5,653,157 A * | 8/1997 | Miller | 366/197 |
| 5,580,007 A | 12/1997 | Caviezel et al. | 241/199.12 |
| 5,778,761 A * | 7/1998 | Miller | 366/197 |
| 5,962,060 A | 10/1999 | Farrell | 426/565 |
| 6,095,032 A * | 8/2000 | Barnett et al. | 99/287 |
| 6,326,047 B1 * | 12/2001 | Farrell | 426/519 |

\* cited by examiner

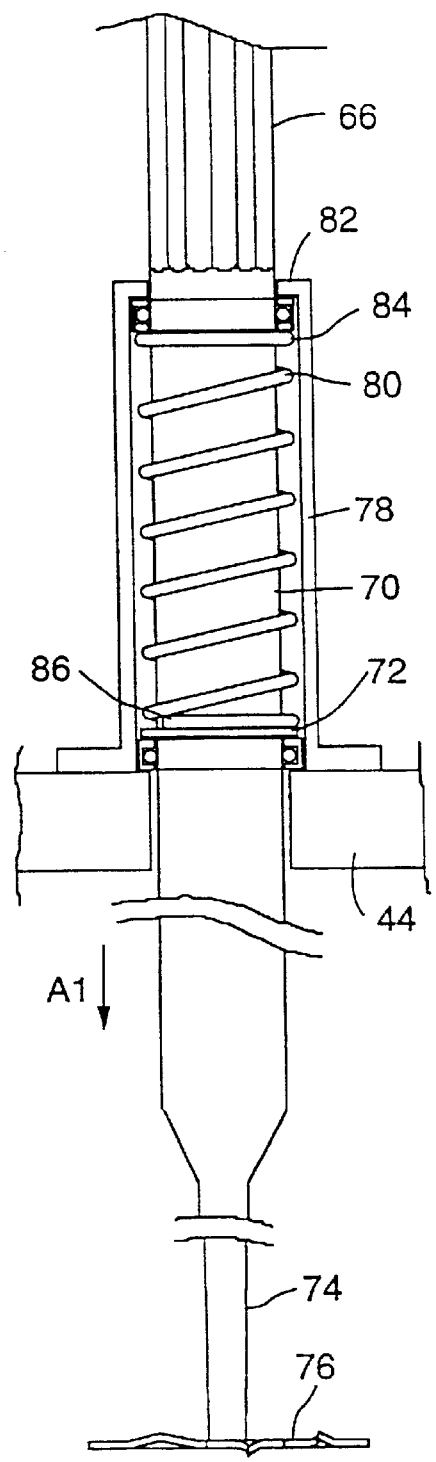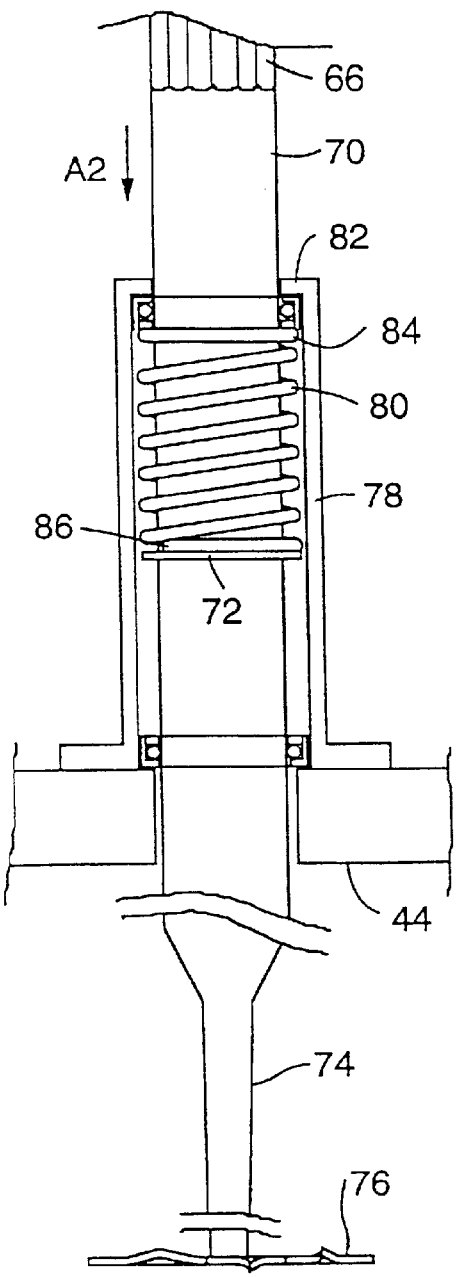
FIG. 6A
FIG. 6B

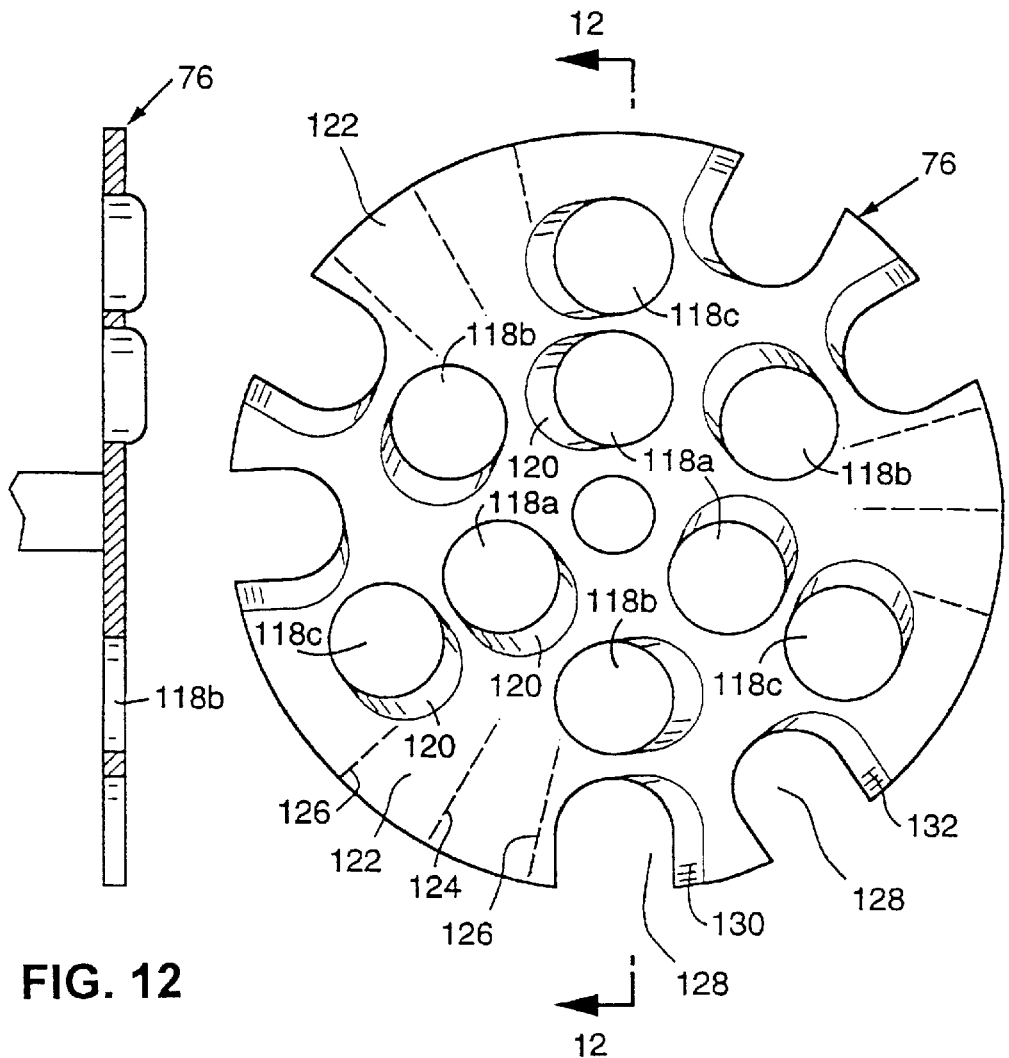
FIG. 12
FIG. 11 A
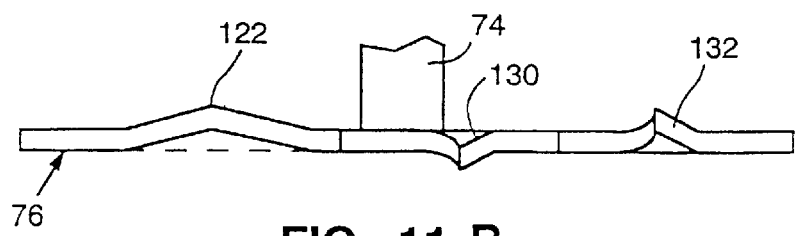
FIG. 11 B

APPARATUS FOR MAKING FROZEN DRINKS

CROSS-REFERENCE TO RELATED APPLICATION(S)

This application claims priority from divisional U.S. patent application Ser. No. 08/866,548, filed on May 30, 1997, for "Apparatus and Method for Making Frozen Drinks" by James J. Farrell.

FIELD OF THE INVENTION

The present invention relates generally to the field of food processing methods and equipment, and particularly to apparatuses and methods for making milkshakes and other frozen drinks.

BACKGROUND OF THE INVENTION

The present invention relates to an improved means of making milkshakes and other frozen drinks. Currently the two commercially prevalent methods of making milkshakes and other frozen drinks are: 1) placing frozen ingredients such as ice cream scoops or ice or frozen fruit into a blending/mixing receptacle, then adding cool liquid such as milk or juice or water, and then blending them together, or 2) using a dispensing freezer of the type in which liquid ingredients are automatically fed into a freezing cylinder, agitated by a dasher in the cylinder during the freezing operation, and then dispensed when desired through a front discharge valve.

The first method, while delivering an excellent quality milkshake or frozen drink, takes too much time and labor to be viable in high volume fast-food restaurants, where a major portion of the potential market lies. The second method, using a dispensing freezer, dominates the fast-food market, yet possesses several serious short-comings. The required dispensing freezer equipment is expensive to purchase, and very time consuming and expensive to clean and maintain. In addition, the quality of product this equipment produces, by its nature, does not recreate the "old fashioned" style texture that can only be achieved by blending frozen ingredients together with liquid ingredients and then serving immediately. Consumers do not respond nearly as favorably to the homogeneous texture produced by the dispensing freezer equipment as they do to the old fashioned texture, and therefore, these dispensing freezer drinks do not sell well, holding less than 3% market share of total restaurant beverage sales today.

The overall goal of this invention is to enable the creation of a consumer preferred old fashioned texture milkshake or other frozen drink that will fit into the operational constraints of today's high volume fast-food restaurants. In order to meet the operational constraints of today's fast-food restaurants this invention was developed to achieve several objectives.

One objective is to create a milkshake or other frozen drink in 30 seconds or less. In the fast-food market literally every second of preparation time is critical. By enabling preparation time to be reduced by even a few seconds, a number of features of this invention are significant improvements over the existing art.

Another object of the present invention is to achieve high levels of whipping/aeration of the frozen drink, and preferably whipping/aeration of at least 15% of total volume. This level of whipping is important for two reasons. First, it is critical to keeping ingredient costs of this new method in competitive alignment with milkshakes and frozen drinks produced by dispensing freezers, which are whipped to this level of aeration and higher. Second, whipping also substantially improves flavor delivery of a frozen drink by improving a consumer's ability to taste the drink as their sense of smell senses the frozen drink's aroma trapped inside the tiny bubbles created by the whipping process.

In Applicant's U.S. Pat. No. 5,962,060, the disclosure of which is incorporated herein by reference, a method for making frozen drinks is described which meets the listed objectives. The application describes a method and apparatus which allows milkshakes and other frozen drinks to be quickly made by breaking up frozen blocks of ingredients into small frozen particles, and combining them with an added liquid. The ingredients to be frozen into frozen blocks are pre-mixed in liquid form, placed into serving cups which are the same serving cups in which the finished milkshake or frozen drinks are to be served, and then frozen into blocks conforming to the insides of the serving cups and stored.

According to the disclosure, when a milkshake or other frozen drink is to be made, a serving cup containing the frozen block is positioned in the machine. A rotating blade is lowered into the cup and bores through the frozen substance in the cup. Milk or another liquid is added to the cup for blending with the frozen substance, which is broken up into small frozen particles by the boring blade. The machine introduces air into the liquid or the liquid plus frozen particle mixture in order to give the milkshake or frozen drink its proper volume, texture, and flavor delivery.

For certain applications, it may be desirable to use water or another non-dairy liquid in the frozen drink making process just described. It has been found, however that when a non-dairy liquid is used as the added liquid in the process, a frozen beverage having a diluted, watery taste and granular consistency generally results.

Given the desirability of frozen drinks having a full-bodied flavor and a very smooth, "old-fashioned style" consistency, the present invention is directed to achieving full-bodied flavor delivery from the frozen ingredients used, and eliminating the granular consistency which may result when non-dairy liquids are used in the frozen drink process.

BRIEF SUMMARY OF THE INVENTION

The present invention is a method for making frozen drinks from a block of frozen substance, and an apparatus which may be used in carrying out the method. According to the method of the present invention, a block of frozen substance is held in a vessel while a blade having features for grinding the frozen substance acts on the block, grinding the frozen substance while a heated liquid is simultaneously introduced into the vessel. An apparatus according to the present invention supports a cup containing the frozen substance, and includes a rotatable blade which is lowered into the cup and means for pumping a heated liquid into the cup.

BRIEF DESCRIPTION OF THE DRAWINGS

FIG. 6A is a front elevation view of a portion of the carriage, the sleeve mounted to the carriage, and the blade shaft extending through the sleeve and the carriage. The sleeve and carriage are cut away to more clearly illustrate the structure of the shaft and the contents of the sleeve.

FIG. 6B is a front elevation view, similar to the view of FIG. 6A, in which the spring is in a compressed state.

FIGS. 11A and 11B are a top plan view and a side elevation view, respectively, of a blade according to the present invention.

FIG. 12 is a cross-sectional side view of the blade of FIGS. 11A and 11B, taken along the plane designated 12—12 in FIG. 11A.

DETAILED DESCRIPTION

Generally speaking, the method of making milkshakes and frozen drinks according to the present invention allows milkshakes and other frozen drinks to be quickly made by breaking up frozen blocks of ingredients into small frozen particles, and combining them with an added heated liquid. The ingredients to be frozen into frozen blocks are premixed in liquid form, and then frozen into blocks and stored. The ingredients may be frozen into single-serving blocks which may be removed from the freezer as needed for making individual frozen drinks. Alternatively, the ingredients may be frozen into serving cups which are the same serving cups in which the finished milkshake or frozen drinks are to be served.

During the frozen drink making process, the frozen block is acted upon by a rotating blade, which grinds the frozen substance into small frozen particles. Heated liquid is added to the frozen block for blending with the frozen particles. The blade may also introduce air into the liquid or the liquid plus frozen particle mixture in order to improve the milkshake or frozen drink's volume, texture, and flavor delivery.

For the rest of this detailed description, the details of the invention will be provided with milkshakes as the end-product being produced, though it is to be understood that end-products such as smoothies or a variety of other frozen drinks can be made by the machine and method described herein.

Figure 1:
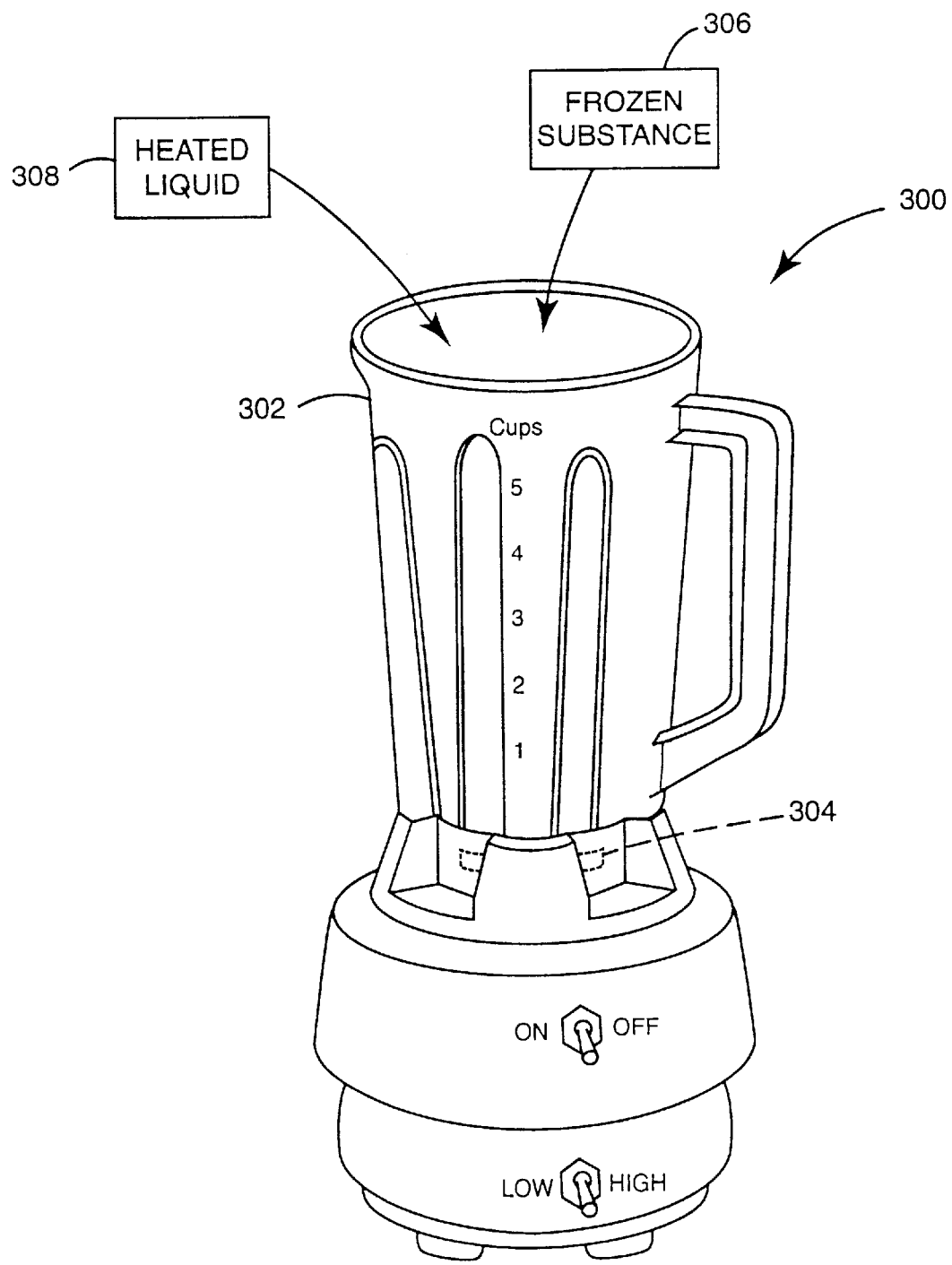
FIG. 1 is a schematic representation of the method according to the present invention as carried out using a blender.

In its simplest form, the method of the present invention may be carried out using a conventional blender, which, like blender 300 of FIG. 1, includes a blending chamber 302 and a rotatable blade 304.

First, ice cream mix is combined with concentrated milk; that is, milk with a portion of its water content evaporated. A preferred mixture includes typical ice cream mix as specified in the following chart, combined with milk which has been concentrated to one half its beginning weight through evaporation as also specified, resulting in the combined product as specified.

Sample Formula Specification Table

| | Ice Cream Mix + | Concentrated Milk = | Combined Product |
|---|---|---|---|
| Weighted Ounces | 7 | 3 | 10 |
| Percentages by Weight: | | | |
| Milk Fat | 10.0% | 7.0% | 9.1% |
| Non-Fat Milk Solids | 12.0% | 17.0% | 13.5% |
| Sugar | 15.0% | 0.0% | 10.5% |
| Emulsifiers and Stabilizers | 0.3% | 0.0% | 0.2% |
| Water | 62.7% | 76.0% | 66.7% |
| TOTAL | 100.0% | 100.0% | 100.0% |

This mixture is then frozen into an ice cream like frozen substance by incorporating air as it is agitated and frozen, such that the finished product is approximately 35% air by volume. Naturally, the ingredients and quantities may vary without departing from the scope of the present invention. Preferably, the mixture is frozen into single serving quantities of 13 fluid ounces for a 16 fluid ounce milkshake.

Referring to FIG. 1, when a milkshake is to be made, a scoop or block 306 of this ice cream like frozen substance is positioned in the blending chamber 302. A measured quantity of heated water is added to the blending chamber. The blender is switched to the "on" condition to begin rotation of the blade 304. The rotating blade 304 grinds through the frozen substance in the cup and blends the added heated water with the frozen substance as it is broken up into small frozen particles by the blade.

If unheated tap water were added rather than heated water, even if the milk portion of the frozen ingredients had been more greatly concentrated to compensate for the greater quantity of unheated tap water to be added, the amount of added water necessary to achieve the proper thickness of milkshake would cause the milkshake to have a watery taste. Moreover, a portion of the added unheated tap water would freeze into small ice granules during blending, causing the resulting milkshake to lack the smooth texture that is most desirable for milkshakes.

It has been found that this phenomenon can be eliminated if the water is heated before it is introduced into the blending chamber 302. By heating the water, three improvements are achieved simultaneously. First, the amount of water necessary to achieve the proper thickness of finished frozen beverage is greatly reduced. For instance, to achieve the proper thickness of finished frozen beverage, a 13 fluid ounce frozen block of ice cream like frozen substance requires the addition of 6 fluid ounces of water at the typical 50° F. achieved by using ambient tap water, but only 3 fluid ounces of water heated to 170° F. This reduction in quantity of added water impacts the watery taste problem because approximately half as much water is added, directly resulting in a less watery, more full-bodied taste. Second, as the hot water is cooled from its elevated temperature by the frozen substance during mixing, the hot water proportionally causes more of the frozen substance to be melted and incorporated into the added water, resulting in a greater concentration of the ingredients from the frozen substance being mixed into the liquid phase of the frozen beverage. The liquid phase of a frozen beverage has a much greater impact on taste than the frozen phase because it is able to be sensed by the taste buds more readily. Thus, this higher concentration of frozen ingredients melted into the liquid phase also helps very substantially to solve the watery taste problem. Third, because of the greater concentration of frozen ingredients melted into the liquid phase of the frozen beverage, the freezing point of the liquid phases is depressed further by the use of heated water. The temperature of the liquid in a finished milkshake is typically 29° F. This is due to its concentration of sugars, which depress the freezing point from 32° F. for pure water. When typical 50° F. tap water is used, the concentration of sugars combining with the water in the liquid phase are insufficient to depress the freezing point of the added water to the 29° F. level, and the frozen ingredients cause a portion of the added water to freeze into small crystals. This freezing causes a granular texture. When heated water is used, the concentration of sugars in the liquid phase reaches a level adequate to depress the freezing point of the liquid phase to a level where any appreciable freezing of the water from the liquid phase into ice crystals is eliminated. This eliminates the granular texture problem.

An alternative embodiment of an apparatus for use in carrying out the method of the present invention is shown in FIGS. 3 through 13. While a blender works well at carrying out the method, the apparatus of FIGS. 3 through 13 is more appropriate for commercial food service in that it eliminates much of the time and labor needed using the blender method. In addition, it has the added advantage of being able to incorporate air into the frozen beverage during the mixing process. This ability to incorporate air allows the use of a frozen block of ingredients which is not pre-aerated, further simplifying the preparation of the frozen ingredients.

Cup and Ingredients

Figures 2, 3:
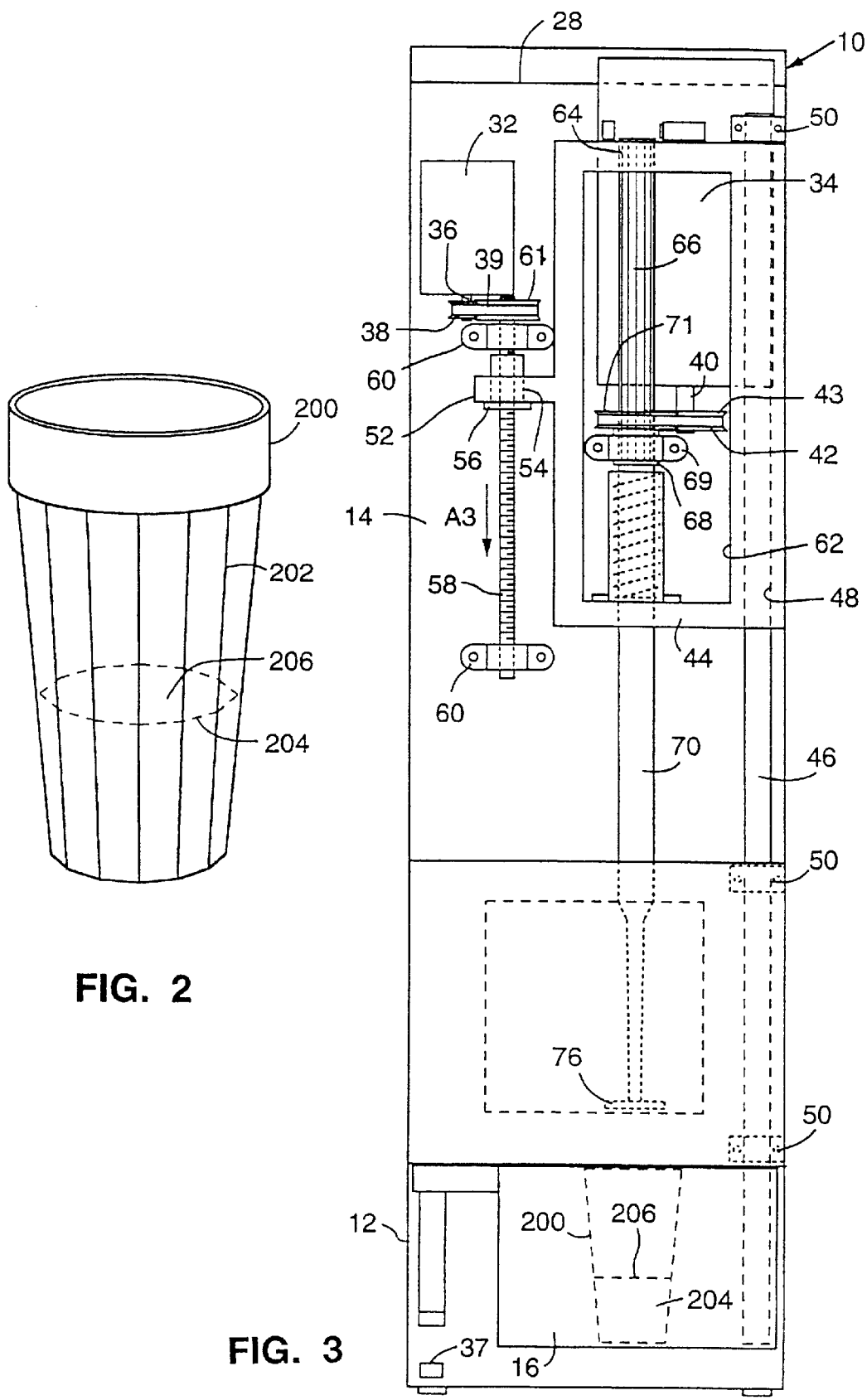
FIG. 2 is a perspective view of a milkshake cup according to the present invention.
FIG. 3 is a front elevation view of a frozen drink machine according to the present invention, in which a front panel is removed to expose the carriage and blade drive assemblies.

A serving cup 200 of the type which maybe used in the method and apparatus according to the present invention is shown in FIG. 2. The exterior surface of the cup 200 includes a plurality of ridges 202.

When ready for use in the machine according to the present invention, the cup 200 contains milkshake ingredients which are frozen into a block 204 which conforms to the shape of the cup. The block 204 includes an upper surface 206. The frozen substance preferably comprises all the ingredients required to make a milkshake, with the exception of the air and a portion of the water. The Sample Formula Specification Table above lists preferred quantities for ingredients, with the exception of the air. Air is an important ingredient in a finished milkshake because it gives the milkshake its proper volume and texture, and improves flavor delivery. Specifically, a cup which will yield a sixteen fluid ounce volume milkshake typically contains a frozen block 204 of approximately ten fluid ounces of combined product, but with no air incorporated. This ten ounces of combined product consists of seven ounces of standard ice cream mix combined with six ounces of milk, as would be used in a conventional old-fashioned milkshake, except that the six ounces of milk has been reduced to three ounces of concentrated milk by evaporating out three ounces of water. This three ounces of water which has been evaporated out will be added back into the milkshake mixture later as the heated water during mixing in the frozen drink machine 10. It should be pointed out that this approach differs from placing ice cream or an ice cream like frozen substance, as used in the earlier conventional blender example, in the cup because they, by definition, contain air which is incorporated during freezing. For instance, the ice cream typically used in old-fashioned scooped type milkshakes-typically contains approximately 35%–50% air by volume. At the completion of the milkshake making operation, the ten fluid ounces of combined product will have had three fluid ounces of heated water added, for a sub-total of thirteen fluid ounces, plus three fluid ounces of air incorporated by the whipping action of the rotating blade, resulting in the desired sixteen fluid ounce, full-bodied, smooth textured finished milkshake.

The ingredients are frozen into the cup 200 and form a block of frozen substance that typically fills the cup by approximately 60% of its total volume. As will be appreciated below, the full volume of the cup is used to contain milkshake once the heated liquid and air are introduced into the cup during a milkshake making operation.

Milkshake and Frozen Drink Machine

Figure 4:
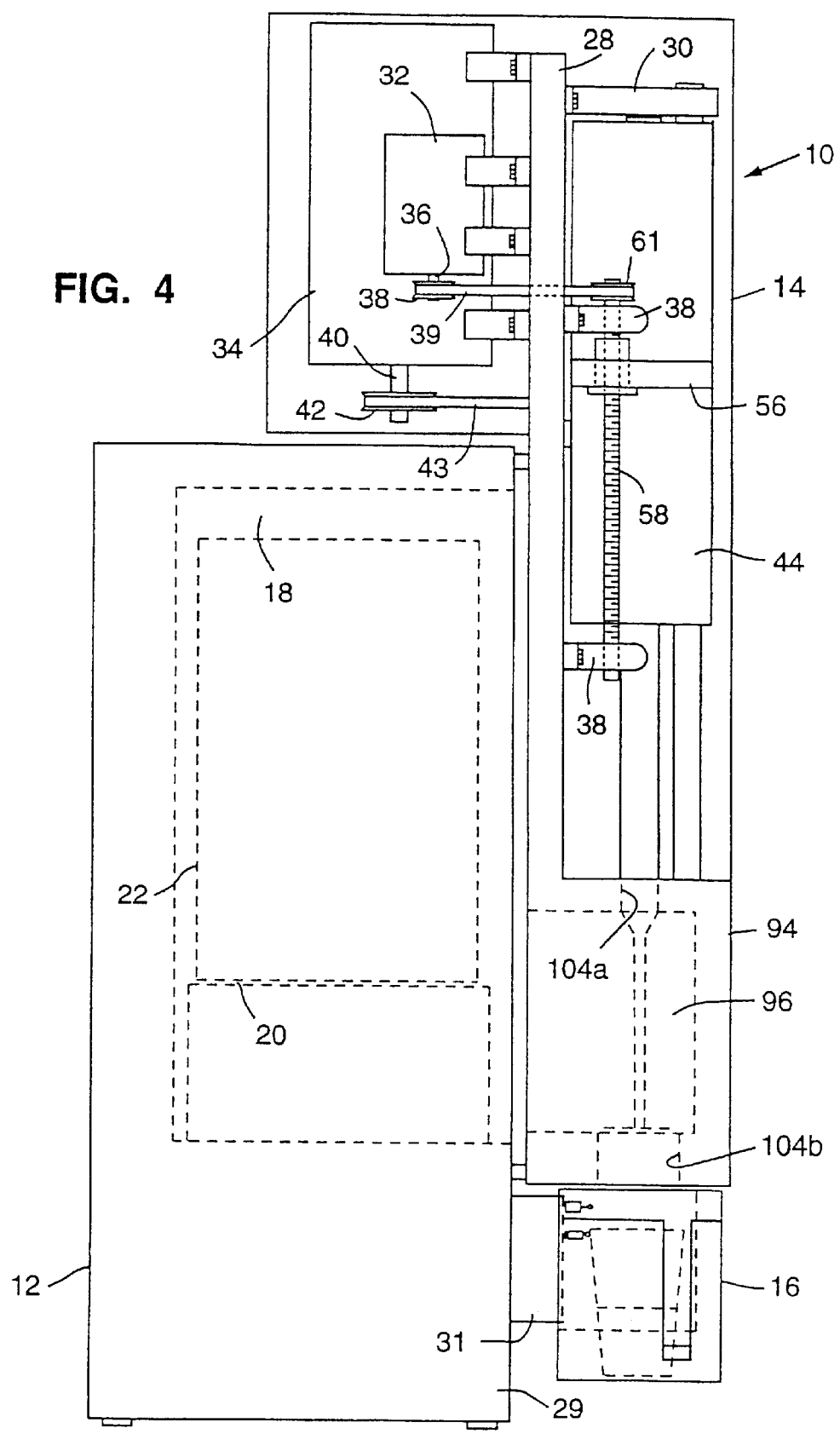
FIG. 4 is a side elevation view of the frozen drink machine of FIG. 3.

Referring to FIGS. 3 and 4, the frozen drink machine 10 according to the present invention is comprised generally of a rear housing 12, a blending assembly housing 14, and a cup housing 16.

Figure 5:
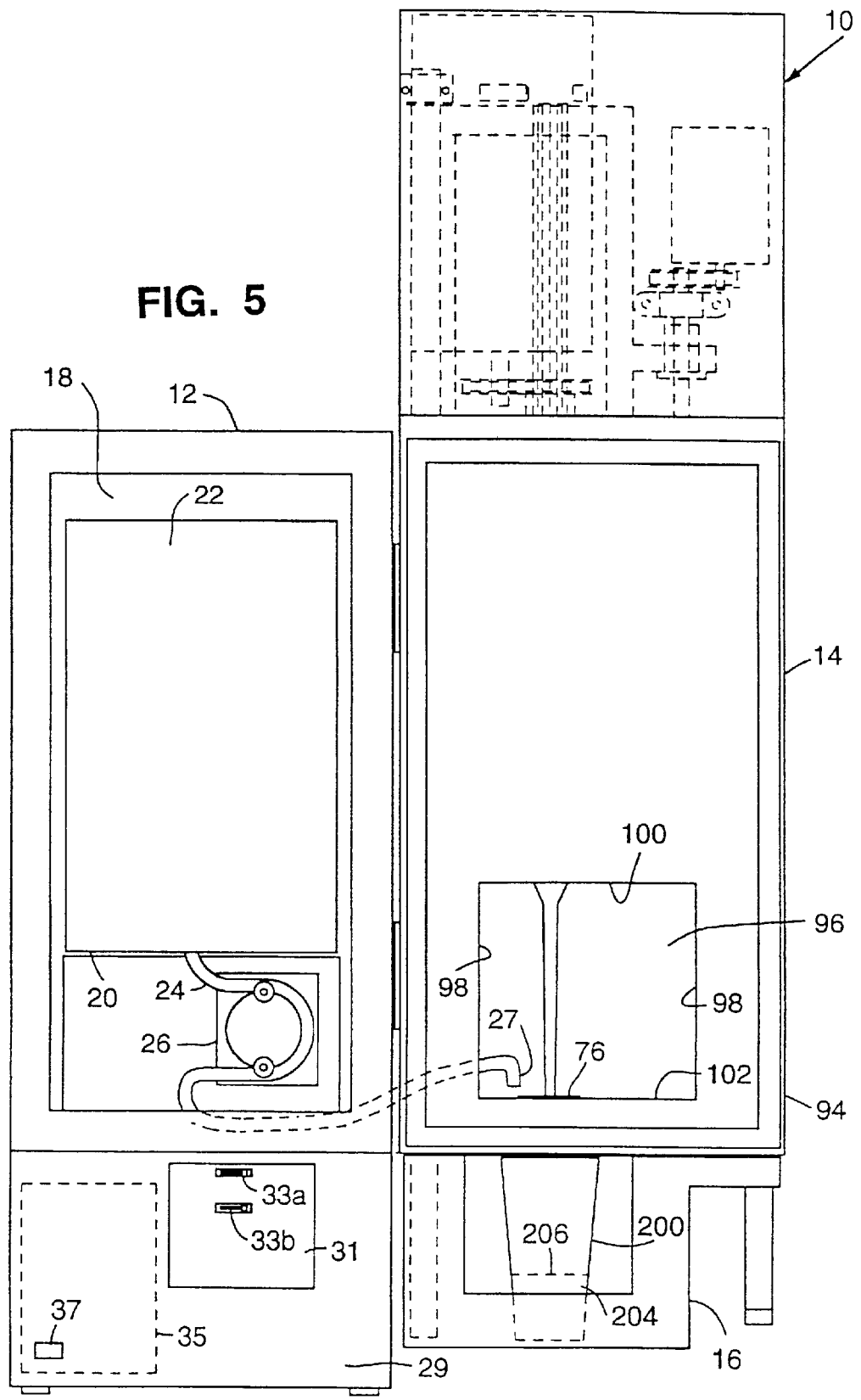
FIG. 5 is a front elevation view of the frozen drink machine of FIG. 3 in which the blending assembly housing has been pivoted to an open condition to expose the interior of the refrigerator housing and to further expose the back side of the blending assembly housing.

Referring to FIG. 5, the rear housing 12 includes a compartment 18 having a shelf 20. Above the shelf 20, compartment 18 contains a liquid reservoir 22 for containing the liquid (preferably water) which is added to the cup during milkshake processing. The liquid may be pumped into the reservoir 22 by an external source or it may be installed in replaceable containers. Reservoir 22 may be a heated vessel similar to a conventional hot water heater or it may be configured to receive heated liquid from an external source. Water in reservoir 22 is stored at an elevated temperature well above room temperature, preferably approximately 100° F.–180° F. and most preferably 170° F.

A tube 24 extends from liquid reservoir 22 and extends through a peristaltic pump 26. Tube 24 has an open end 27 positioned within blending assembly housing 14.

Rear housing 12 includes a base portion 29 which lies below the rear compartment 18. A block 31 (FIGS. 4 and 5) extends from the base portion 29 and supports a pair of limit switches 33a, 33b.

A microprocessor 35 (FIG. 5) is contained within the base portion 29 of the rear housing 12. As will be discussed in detail below, the microprocessor 35 receives information from the limit switches 33a, 33b and other sensors which monitor operation of the milkshake machine, and manages the operation of the milkshake machine. A starting switch 37 is located on the front of the rear housing 12 and is interfaced with the microprocessor 35 to deliver starting signals to the milkshake machine when triggered by a user.

Referring to FIG. 4, blending assembly housing 14 is hinged to the rear housing 12 so that blending assembly housing 14 can be pivoted into the open position shown in FIG. 5 in order to allow the water supply (if a replaceable source is used) to be replaced. A support frame 28 is mounted to the blending assembly housing 14. Upper and lower support members 30 extend laterally from support frame 28.

Referring to FIGS. 3 and 4, two motors are mounted to frame 28 within the housing 14: a carriage motor 32 and a blade motor 34. Carriage motor 32 includes a shaft 36 which spins when the motor is activated. Shaft 36 is coupled to a first pulley 38 and a belt 39 is driven by first pulley 38. Carriage motor 32 is preferably a stepper motor capable of 1500 RPM and 140 ounce-inches of torque.

Blade motor 34 is preferably a one horsepower motor capable of up to 3400 revolutions per minute. It includes a rotatable shaft 40 which is coupled to a second pulley 42 such that activation of the blade motor 34 results in rotation of the second pulley 42. A belt 43 is driven by second pulley 42.

A carriage 44 is located within the housing 14. An elongated rod 46 (FIG. 3) extends through a bore 48 in the carriage 44 and is fixed to the support members 45. Rod 46 is secured to the blending assembly housing 14 by a number of mounting blocks 50. The bore 48 is proportioned such that the carriage 44 can slide easily along the rod 46, and linear bearings (not shown) are pressed into the ends of bore 48 to aid the sliding motion.

Referring to FIG. 3, carriage 44 includes a laterally extending member 52 having a bore 54. A ball nut 56 is secured within the bore 54, and a vertical screw drive 58 extends through the ball nut 56. The screw drive 58 is mounted to the support frame 28 by a pair of mounting members 60.

A third pulley 61 is attached to one end of screw drive 58. Belt 39 is coupled to pulley 61 such that rotation of pulley 38 results in corresponding rotation of third pulley 61. Thus, activation of carriage motor 32 results in rotation of screw drive 58. When screw drive 58 is rotated in this manner, ball nut 56 is caused to travel vertically along the screw drive 58 and to thereby move the carriage 44 vertically upward or downward, depending on the direction in which the screw drive is rotating.

Carriage 44 is a substantially rectangular frame having a rectangular center opening 62. A bore 64 extends through the upper end of the carriage 44 and into the opening 62. A splined spindle shaft 66 is slidably disposed in the bore 64. Splined shaft 66 extends through a bearing 68 which is mounted to the support frame 28 by a support 69. A fourth pulley 71, which is internally splined, is attached to the bearing 68 and belt 43 is coupled to fourth pulley 71. Thus, rotation of second pulley 42, such as by activation of blade motor 34, causes resultant rotation of splined fourth pulley 71.

During rotation of splined pulley 71, the splines in splined shaft 66 and splined pulley 71 are rotationally engaged with one another such that rotation of splined pulley 71 causes rotation of splined shaft 66. This engagement, however, does not prevent the splined shaft 66 from sliding vertically within the splined pulley 71 and bearing 68 during vertical movement of the carriage 44.

Splined shaft 66 includes a smooth section 70. A collar 72 (FIGS. 6A and 6B) surrounds and is fixed to the smooth section 70 of shaft 66. Shaft 66 further includes a tapered section 74 and a blade 76 attached to the tapered section 74.

Referring to FIG. 6A, smooth section 70 of shaft 66 extends through a sleeve 78 mounted to the carriage 44 within the opening 62 (opening 62 shown in FIG. 2). A shoulder 82 is formed at the top of sleeve 78.

A compression spring 80 surrounds the shaft section 70 and is housed within the sleeve 78. Spring 80 has a first end 84 which abuts the shoulder 82 and a second end 86 which abuts collar 72. When carriage 44 advances downwardly in the direction indicated by arrow Al, and blade 76 reaches the surface 206 of the frozen substance 204 in the cup, spring 80 becomes compressed between shoulder 82 and collar 72 as indicated in FIG. 6B. Gradually, shaft 66 slides downwardly, as indicated by arrow A2 in FIG. 6B, through the sleeve 78 until spring 80 returns to its relaxed condition shown in FIG. 6A.

Figure 7A:
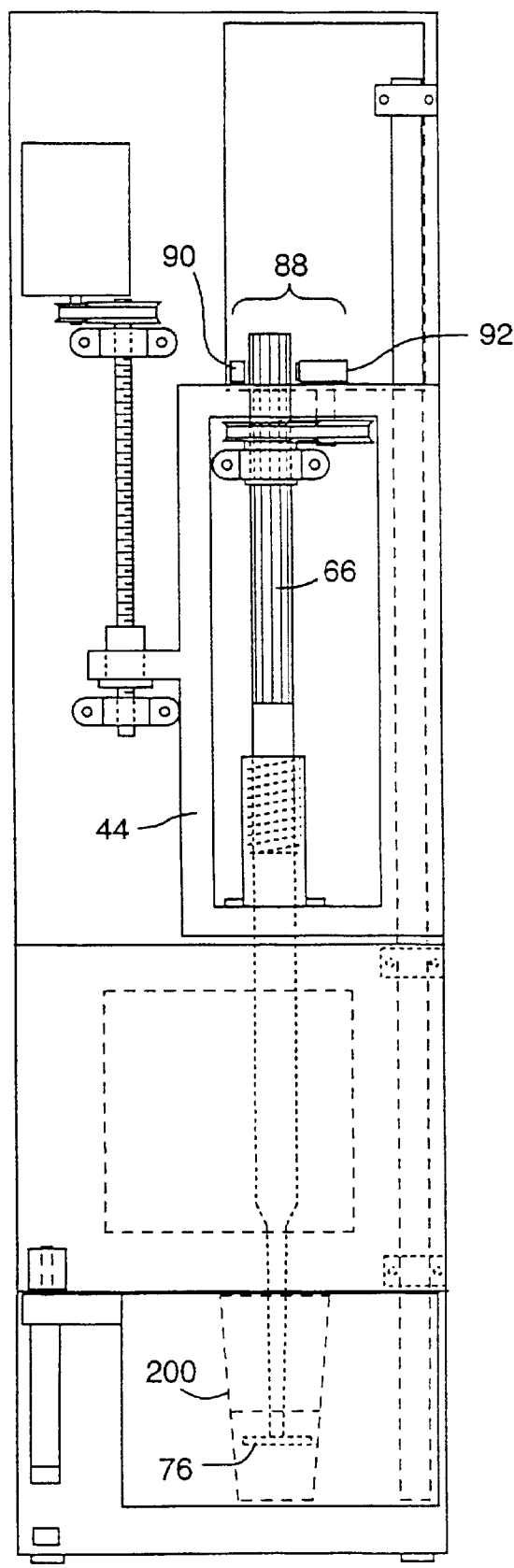
FIG. 7A is a front elevation view of the frozen drink machine of FIG. 3 showing the carriage at the end of its downward travel and showing the blade moving downwardly within the serving cup.
Figure 7B:
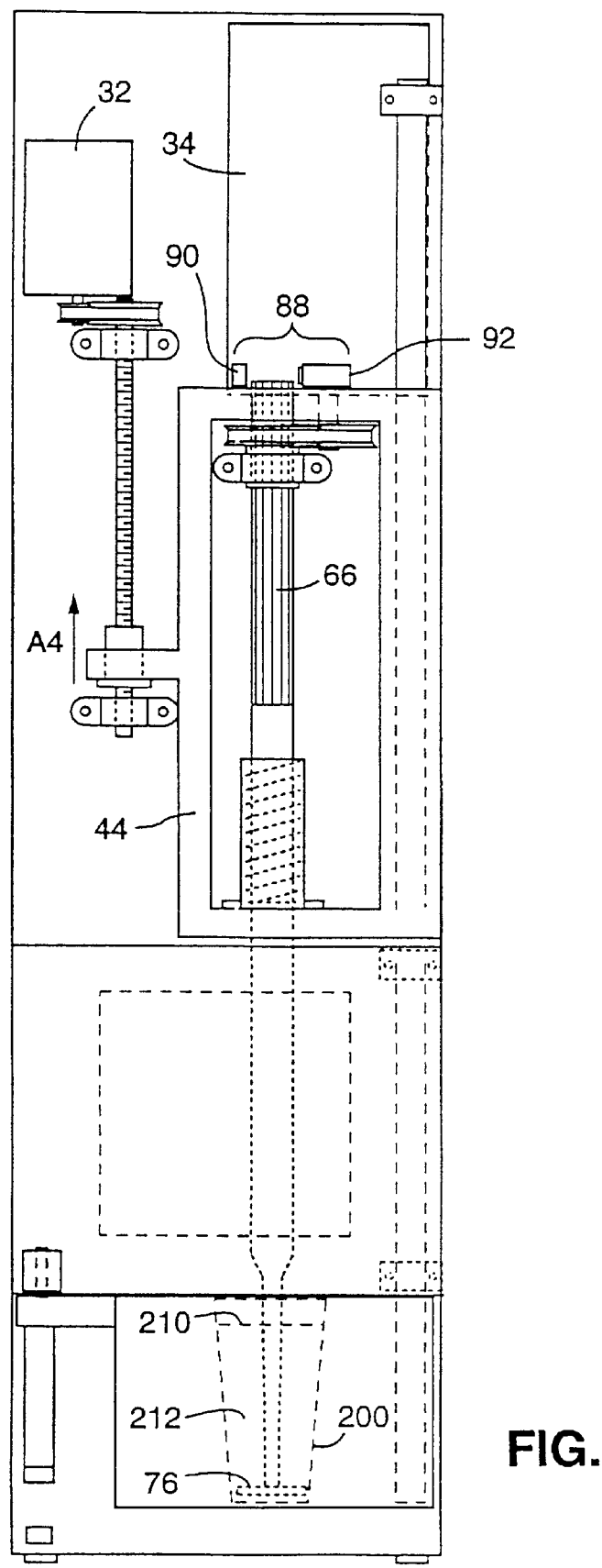
FIG. 7B is a front elevation view of the frozen drink machine of FIG. 3 showing the carriage and the blade at the ends of their respective downward travels.

Referring to FIGS. 7A and 7B, an optical detector 88 is mounted to the top of carriage 44. Optical detector includes a light source 90 and a receiver 92 which detects light emitted by light source 90. Optical detector 88 is positioned to detect whether the upper end of splined shaft 66 is extending above the carriage 44. When the upper end of the shaft 66 extends above the carriage 44, receiver 92 is prevented from receiving light emitted by light source 90. When the carriage 44 is lowered and the upper end of the splined shaft 66 can be detected by the optical detector 88, it indicates that the blade 76 has not yet reached the bottom of the serving cup 200 which contains the milkshake ingredients.

Optical detector 88 is electronically coupled to microprocessor 35 (FIG. 5). When the blade 76 reaches the bottom of the serving cup 200 during use of the milkshake machine, this information is received by the microprocessor 35 and used to control the milkshake making operation as will be discussed below.

Figure 8:
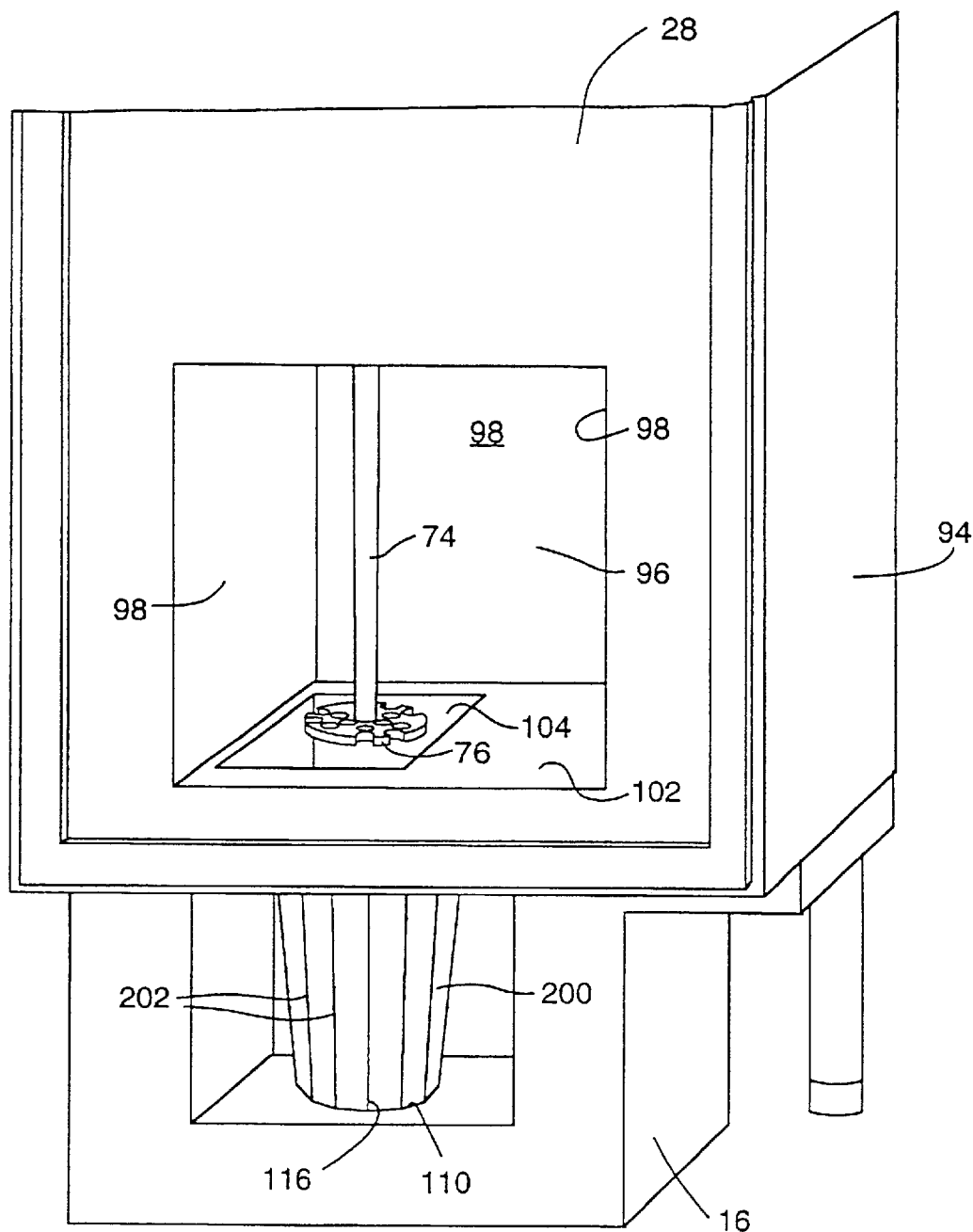
FIG. 8 is a perspective view of the cup housing according to the present invention.

Referring to FIGS. 4, 5 and 8, support frame 28 has a lower portion 94 positioned above the cup housing 16. Lower portion 94 includes a recessed section 96 which, when the blending assembly housing 14 is pivoted to the closed condition shown in FIG. 4, faces the portion of the rear compartment 18 which lies below shelf 20.

Recessed section 96 is bounded by three side walls 98, a top wall 100 (FIG. 5), and a bottom wall 102. Openings 104a, 104b shown in FIG. 4, are formed in top and bottom walls 102. These openings permit the blade 76 to extend into the recessed section 96 and to pass from the recessed section into the cup 200.

A solenoid latch 103 having a plunger 105 (FIGS. 9A and 9B) is attached to lower portion 94 of housing 14. The solenoid latch 103 works in a conventional manner. Plunger 105 is spring biased in the elevated condition shown in FIG. 10. When solenoid latch 103 is energized, plunger 105 slides vertically downward to the latched position shown in FIGS. 9A and 9B.

Figure 9A:
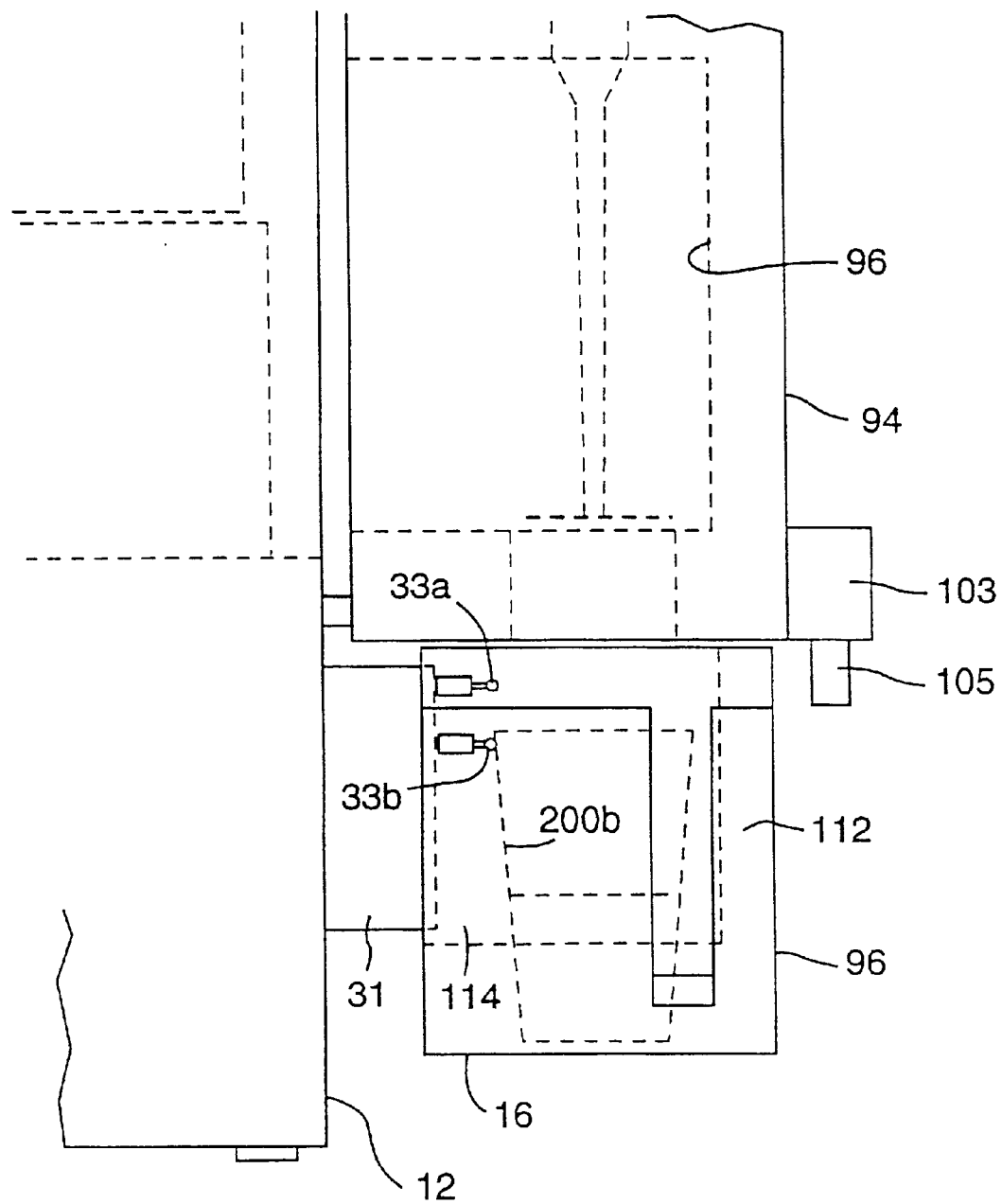
FIGS. 9A and 9B are side views of the cup housing of the frozen drink machine of FIG. 3, showing small and large cups, respectively, positioned in the cup housing.
Figure 10:
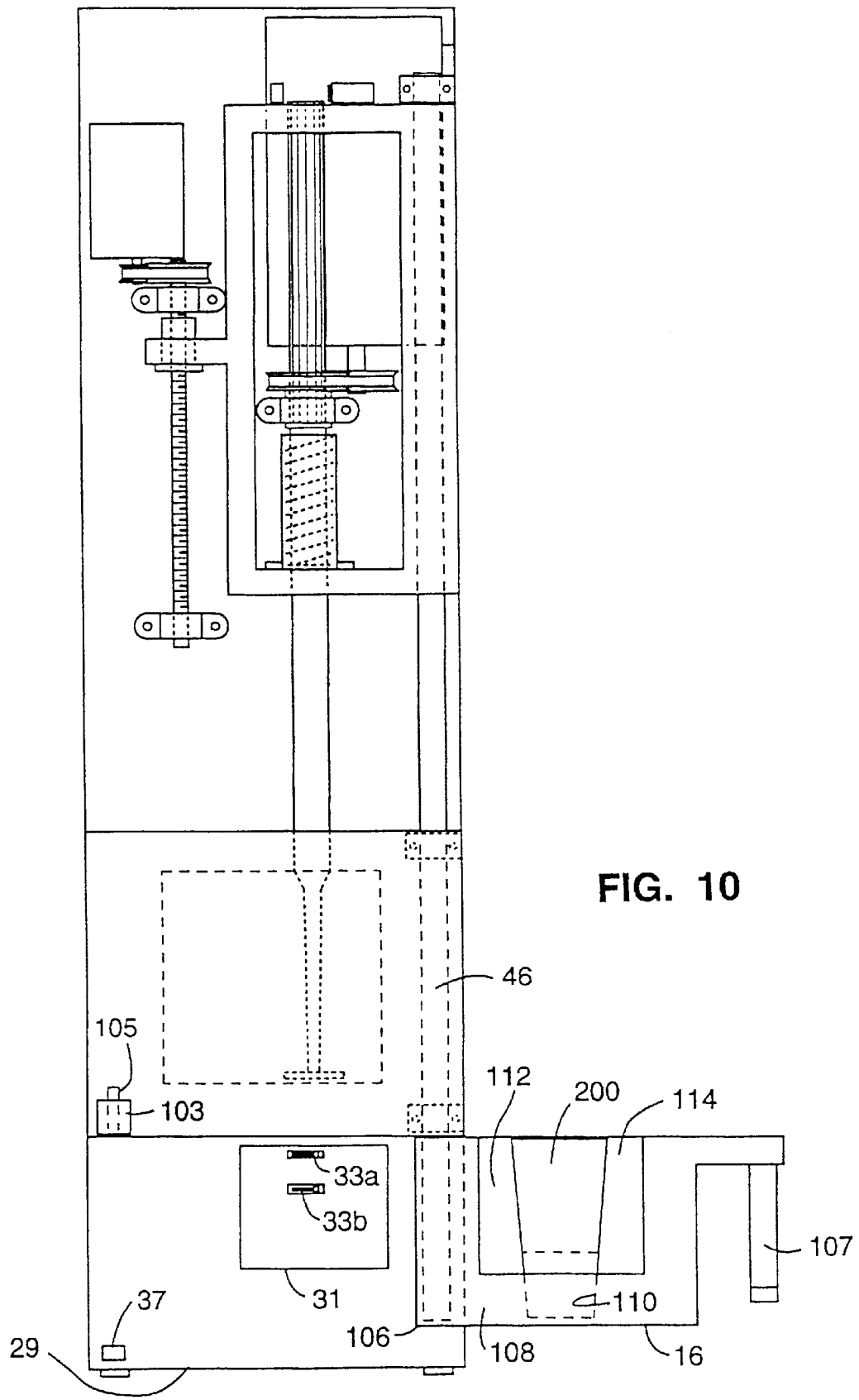
FIG. 10 is a front elevation view, similar to the view of FIG. 3, in which the cup support assembly is pivoted into the opened condition.

Referring to FIG. 10, cup housing 16 includes a side section 106 which is hinged to the rod 46. Cup housing is pivotable about the rod 46 between the closed position shown in FIG. 3 and the open position shown in FIG. 10. A handle 107 is provided to permit the cup housing to be easily pivoted between the closed and open positions. When the solenoid plunger 105 is in the latched position shown in FIG. 9A, it prevents the cup housing from being moved to the open position.

Figure 9B:
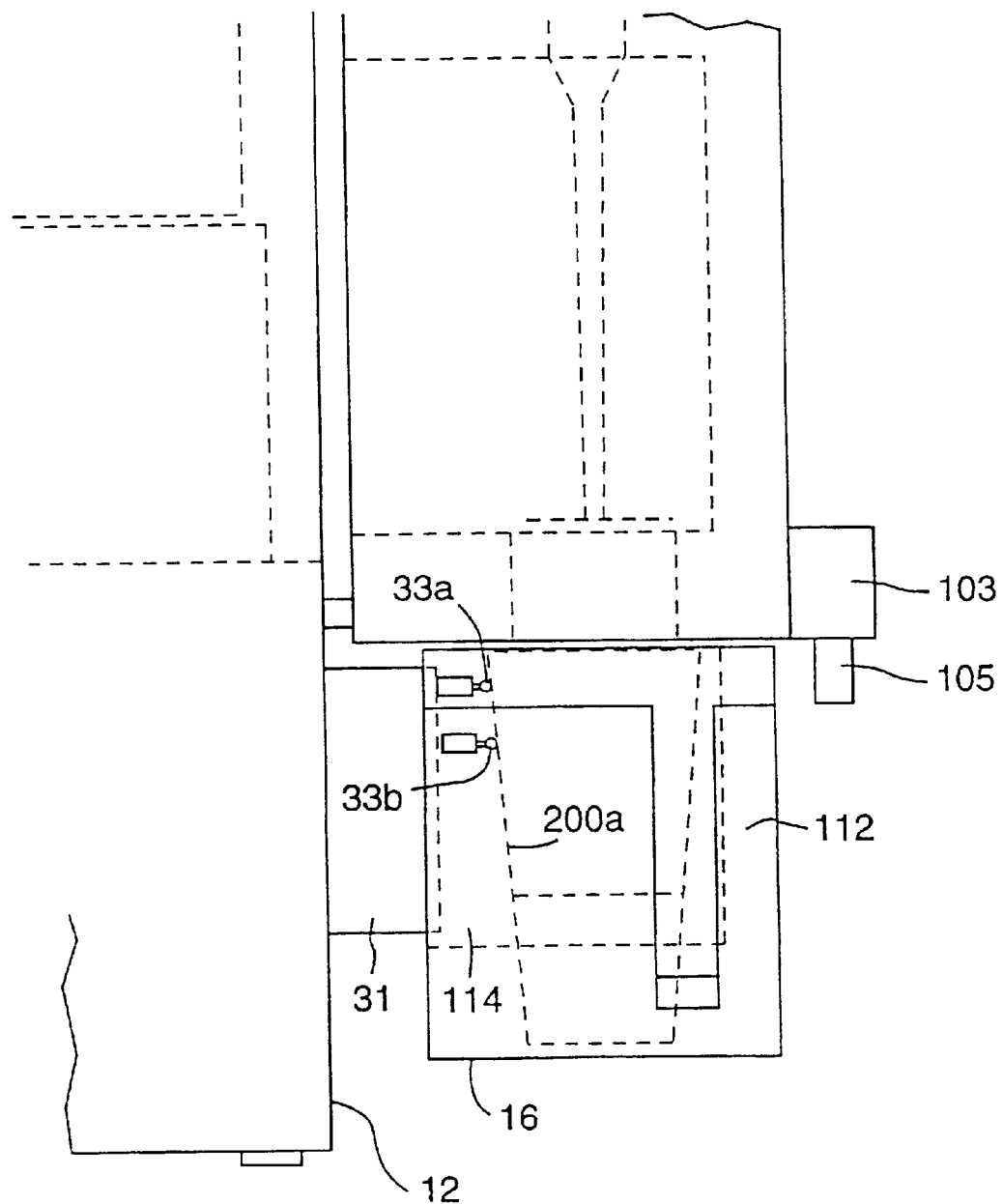

Referring to FIG. 10, cup housing 16 includes a tray 108 which is provided with a cut-out 110 for receiving a serving cup 200. The portion 114 of the cup housing 16 above the tray is open. Cup housing 16 further includes an outer wall 112 which, when the cup housing is in the closed position, causes the cup 200 to be enclosed between the outer wall 112 and base portion 29 of rear housing 12. Moreover, and as best shown in FIGS. 9A and 9B, when the cup housing 16 is in the closed condition, the block 31 which is attached to rear housing 12 extends into the open portion 114 of the cup housing 16. The wall 112 and the block 31 are important because they prevent access to the cup during the processing cycle, when it would be very dangerous to disturb the cup due to the sharp blade spinning at high RPM inside the cup.

Referring again to FIGS. 9A and 9B, when a cup is positioned in the cup housing and the cup housing placed in the closed condition, the cup depresses at least one of the limit switches 33a, 33b. A short cup 200b, shown in FIG. 9A, will depress only lower limit switch 33b, whereas a tall cup 200a, shown in FIG. 9B will depress both lower and upper limit switches 33a, 33b. The switches 33a, 33b provide a means by which the presence of a cup in the cup housing may be detected. As will be described in detail below, when at least one of the switches 33a, 33b is closed, the microprocessor activates solenoid latch 103, causing the cup housing 16 to be locked in the closed condition and generates starting signals which cause the frozen drink making cycle to begin.

The limit switches 33a, 33b also deliver information to the microprocessor 35 (FIG. 5) concerning the size of the cup which is positioned in the cup housing. As detailed below, this will ensure that the appropriate quantity of liquid is delivered into the cup for the size milkshake which is to be made. Also, because the surface 206 (FIG. 2) of the frozen block 204 is lower in a smaller cup than in a relatively larger cup, the microprocessor can ensure that the blade 76 is lowered to the proper height before it is caused to begin spinning.

Referring to the perspective view of FIG. 8, cut-out 110 includes ridges 116 around its perimeter. These ridges are designed to engage with like ridges 202 on the outside surface of the serving cup 200. This prevents cup 200 from rotating within the cut-out 110 as the rotating blade advances through the frozen substance.

Blade

FIGS. 11A and 11B are top and side views, respectively, of blade 76. Blade 76 is preferably a 2.5 inch diameter stainless steel blade having a circular shape and a thickness of approximately 0.080 inches. Three-eighth inch diameter holes 118a, 118b and 118c are spaced 120° apart rotationally and at specific radiuses from the center of the blade such that as the blade makes one complete rotation, the entire surface area of the frozen substance will have been passed over by three holes. Holes 118a are centered 0.041 inches from the blade's center, and holes 118b and 118c are spaced 0.062 inches and 0.083 inches from the blade's center respectively. Depressed regions 120, best shown in the cross section view of FIG. 12, are formed immediately adjacent to each of the holes, located on their trailing edge as the blade rotates. These regions are depressed by 0.080 inches. The holes and the depressed regions are arranged such that as the blade 76 is rotated and advanced into the frozen substance in the cup 200 (FIG. 2), the holes 118a–c and depressed regions 120 grate through the frozen substance much like the grating action of a cheese grater. It should be appreciated that the blade of FIG. 11A is configured such that clockwise rotation of this blade produces the desired grating effect. This arrangement also provides for easy manufacture in a stamping operation, and maintains the mechanical strength of the blade so that its outside edges are not deflected upward by the force of the frozen substance being bored through. Other arrangements with differing size or shaped holes will also work well.

Three waves are formed in the blade. As shown in FIGS. 11A and 12, each of the waves 122 includes a center crease 124 which is elevated above the plane of the blade and side creases 126 which lie in the plane of the blade. The creases 124 and 126 are approximately ½ inches in length and extend radially from the perimeter of the blade. A distance along the perimeter of the blade of approximately ½ inch separates each pair of side creases 126. During high speed rotation of the blade, the waves 122 increase the whipping effect of the blade by causing an alternately high and low pressure zone at the blade's edge, creating turbulent eddies which cause a whipping effect.

Three pairs of cutouts 128 are formed along the perimeter of the blade 76, spaced 120° from each other. Each pair includes a first cutout which has a depressed trailing edge 130 and a second cutout which has an elevated trailing edge 132. During a milkshake making operation, the trailing edge 130 is depressed to act as a grating surface to bore through the frozen substance at the outermost radius of the blade. The trailing edge 132 is elevated to act as a inverted ramped surface to force milkshake downward in the cup and thereby minimize the amount of milkshake that is driven up the interior walls of the cup by centrifugal force. Moreover, by directing milkshake ingredients above the blade, which are carried to the outer edge of the blade by centrifugal force, to then be forced downward and under the blade as the rotating blade moves upward, the elevated trailing edge 132 helps prevent the blade from carrying ingredients up and out of the cup as the blade is lifted from the cup.

Operation

Operation of the frozen drink machine according to the present invention will next be described.

First, cup housing 16 is pivoted to the opened condition shown in FIG. 10 and a cup 200 containing the frozen substance 204 is positioned in the cut-out 110. Cup housing 16 is then pivoted to the closed position shown in FIG. 3.

Next, carriage motor 32 is activated. Activation of carriage motor 32 causes rotation of carriage motor shaft 36 and pulley 38, and through belt 39 further causes rotation of pulley 61 which is attached to the vertical screw drive shaft 58, causing it to rotate. Counterclockwise rotation of screw drive shaft 58, when viewed from the top, causes carriage 44 to advance vertically downward as indicated by arrow A3 in FIG. 3. Carriage 44 has spindle shaft 66 mounted to it such that when carriage 44 advances vertically downward, spindle shaft 66 advances downward as well, with one exception which will be explained shortly. As blade 76, attached to the bottom of spindle shaft 66, approaches the surface 206 of the frozen substance 204, blade motor 34 is activated causing rotation of pulley 42, and through belt 43, rotation of pulley 71 which is attached to spindle shaft 66, causing it and blade 76 to spin. Downward travel of carriage 44 continues and blade 76 makes contact with the surface 206 of the frozen substance and begins boring down through it.

At the time boring begins, the liquid pump 26 is activated and begins pumping heated liquid into the cup through tube 24 for mixing and whipping with the small frozen particulate being created by the boring action of the blade. Approximately three fluid ounces of liquid at an elevated temperature of approximately 100–180° F., but most preferably 170° F., is pumped into the cup over a period of approximately three to five seconds, depending on the desired consistency of the finished milkshake. The elevated temperature of the water results in a more full-bodied taste and prevents the water from forming into ice crystals as it is blended with the ingredients contained in the cup 200, as described earlier.

The downward travel of the carriage 44 is generally driven at a rate faster than the blade 76 can bore through the frozen substance in the cup. This disparity in downward travel rates causes the downward travel of the spindle shaft 66, to which the blade 76 is attached, to be slower than the downward travel of carriage 44. This forces the spindle shaft 66 to move upward within its mountings on the carriage 44 and for spring 80 to be compressed as shown in FIG. 7A. The carriage 44 is driven to its lowest most point of travel, as shown in FIG. 7B, and then the carriage motor 32 is deactivated.

The blade 76 continues to grate and blend the frozen substance 204 within the cup 200 as it moves downward in the cup, driven by the gradual relaxation of the compressed spring 80 (FIGS. 6B and 7A) acting on spindle shaft 70. When the optical detector 88 senses that the spindle shaft has progressed all the way to the bottom of the cup as shown in FIG. 7B, the boring stage of the process is complete.

The reason for this spring release arrangement is to allow for a high rate of travel speed of the carriage 44 from its uppermost position at the beginning of the cycle to the bottom of its travel. This is advantageous because it allows the blade 76 to bore as quickly as the frozen substance will allow. Softer frozen substances can be bored through more quickly. Without this spring release arrangement, time would be wasted as the carriage 44 would have to be driven downward as slowly as the hardest frozen substance could be bored through in order to be sure the blade motor 34 is not stalled out by an excessive torque requirement to continue the blade's rotation. An additional advantage is that the exact rotational speed for the carriage motor 32, driving the downward travel of the carriage during boring, becomes less critical. This simplifies the controls required for this motor.

Given these two advantages of the spring release, it can be appreciated that the same advantages could be accomplished through a variety of other means, including placing the spring mechanism on the screw drive shaft or its mountings rather than on the spindle shaft, or placing a slip clutch in the connection of the carriage motor to the screw drive shaft which would slip as the spindle and carriage's downward travel was caused to slow down by the resistance of the boring blade against the frozen substance.

With the boring stage complete, as signaled by the optical detector 88 when the blade 76 reaches the bottom of the cup, the carriage motor 32 is caused to reverse polarity and is activated to begin to move the carriage, and with it, the spindle drive shaft and blade, upward as indicated by arrow A4 in FIG. 7B. At this point in the process, the rotating blade 76 acts as a mixing and whipping agitator, with the important feature of being formed such that its slim cross-sectional profile does not cause excessive rotation of the entire contents of the cup. The carriage motor 32 raises the carriage, and with it, the rotating blade up through the milkshake, completing the mixing and whipping of the frozen particulate and heated liquid into a milkshake as it travels vertically through it.

Some formulations of milkshake benefit from a second vertical pass of the mixing/whipping blade through the milkshake, in which case the mixing blade's vertical travel is stopped one inch below the surface 210 of the milkshake 212 (labeled in FIG. 7B), and the polarity of the carriage motor 32 is again reversed, and the blade 76 is moved back down to the bottom of the cup. Upon reaching the bottom, the polarity of the carriage motor 32 is again reversed, and the blade is moved back upward in the cup 200 to a point one inch below the surface 210 of the milkshake 212.

With the mixing and whipping process complete, and the blade reaching the point one inch below the surface 210 (FIG. 7B) of the milkshake 212, the blade motor 34 is deactivated and a braking force applied to the blade motor to slow its rotational speed. This slowing of the blade's rotational speed prevents splattering of milkshake out of the cup as the blade breaks through the surface 210 of the milkshake 212. With the rotation slowed, the carriage moves up to a point where the blade is approximately one half inch above the surface 210 of the milkshake 212, but still below the top lip of the cup, and stops momentarily. With the carriage stopped momentarily, the blade motor is reactivated momentarily, causing the blade to spin and fling any remaining milkshake material off the blade and back into the cup below its upper lip. After a momentary spinning of approximately one half second, the blade motor 34 is deactivated, and the carriage motor 32 is reactivated to bring the carriage and blade upward to its original position above the cup. At this point, the process is complete and the cup can be removed for serving by opening cup housing 16 and removing cup 200 from the recess 110.

As shown in FIG. 3, when the carriage 44 and blade 76 are in their original positions, the blade 76 and the narrow portion 75 of shaft 70 are disposed within recessed section 96 of the housing 14.

Microprocessor Control

Figure 13:
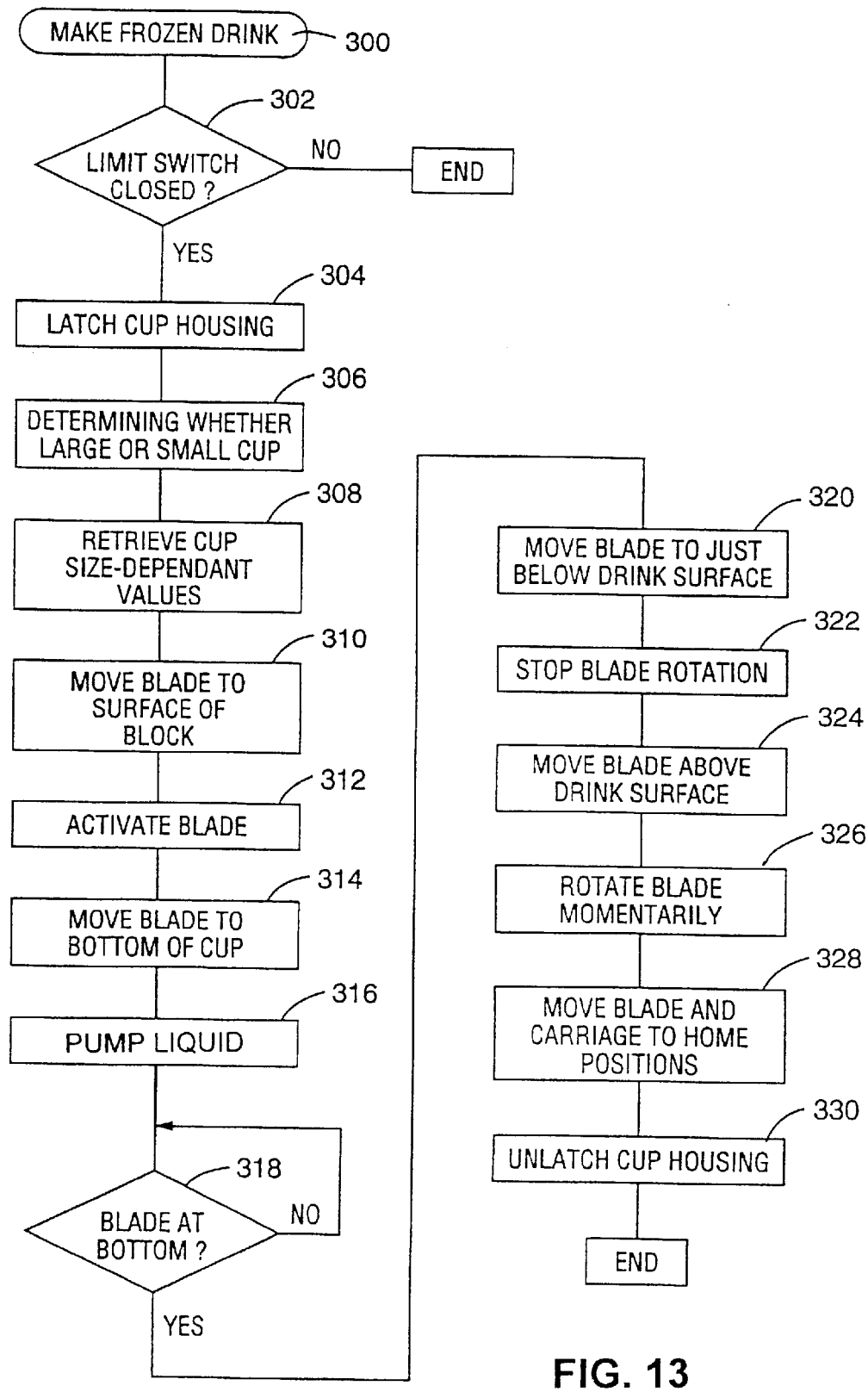
FIG. 13 is a simplified flow diagram showing the functions of the microprocessor of the present invention.

The functions of the microprocessor 35 in controlling the frozen drink making operation will next be discussed with reference to FIG. 13. A frozen drink making operation is commenced at step 300 when a user presses the start button 37 (FIG. 3). Next, the microprocessor 35 detects whether at least one of the limit switches 33a, 33b (FIGS. 9A and 9B) is closed, which indicates the presence of a cup 200 in the cup housing 16. If a limit switch is closed, the microprocessor 35 causes activation of the solenoid latch 103, step 304, such that plunger 105 moves to the latched condition shown in FIG. 9A to latch the cup housing 16. If a limit switch is not closed, the microprocessor terminates the milkshake making procedure or it may alternatively continue monitoring the limit switches for a predetermined period of time.

Next, at step 306 the microprocessor 35 determines whether a tall cup 200a (FIG. 9B) or a short cup 200b (FIG. 9A) is positioned in the cup housing 16 by determining whether only one limit switch 33b is closed, indicating a small cup, or whether both limit switches 33a, 33b are closed, indicating a large cup.

At step 308, the microprocessor retrieves certain cup size-dependent values from look up tables stored in its memory. For example, because a larger quantity of added liquid is needed for a large milkshake than for a small milkshake, one of the stored values is the length of time for which the peristaltic pump 26 will be made to pump heated liquid into the cup 200. The other stored values include (1) those indicating the distance to be traveled, or the amount of time for travel, by the carriage 44 to position the blade 76 at the surface 206 of the frozen block 204, which will be higher for a large cup than it will for a small cup; (2) those indicating the distance to be traveled (or the amount of time for travel) by the carriage from the surface 206 of the frozen block 204 to the bottom of the cup; (3) those indicating the distance to be traveled (or the amount of time for travel) by the carriage to lift the blade from the milkshake to a height just below the upper surface 210 (FIG. 7B) of the milkshake 212; and (4) those indicating the distance to be traveled (or the amount of time for travel) by the carriage to lift the blade from the milkshake to a height just above the upper surface 210 of the milkshake 212.

During steps 310 through 316, the stored values retrieved at step 308 are used to generate control signals which control the carriage motor 32, blade motor 34, and peristaltic pump 26. Specifically, the microprocessor at step 310 instructs the carriage motor 32 to advance the carriage by the appropriate number of steps to position the blade 76 just above the surface 206 of the frozen block. At step 312 the microprocessor further directs the carriage motor 32 to advance the carriage 44 by the appropriate number of steps which will cause the blade 76 to move to the bottom of the cup (step 314). At step 316, the microprocessor delivers control signals to cause the peristaltic pump 26 to pump heated liquid into the cup through opening 37 for the amount of time which will deliver the proper quantity of heated liquid into the cup.

At step 318, the microprocessor looks to the optical sensor 88 and awaits a signal from the optical sensor indicating that the blade 76 has reached the bottom of the cup (FIG. 7B). When the blade 76 has reached the bottom of the cup, the microprocessor instructs (steps 320) the carriage motor 32 to move the carriage 44 vertically upward by an amount which will position the blade 76 approximately one inch below the milkshake surface 210.

Next, the microprocessor directs the blade motor 34 (step 322) to deactivate and thereby slows the rotation of the blade 76. As described above, this prevents splattering of milkshake out of the cup as the blade breaks through the surface 210 of the milkshake 212.

Next, at step 324, the carriage motor 32 is caused to advance the carriage 44 such that the blade 76 is approximately one half inch above the surface 210 of the milkshake 212, but still below the top lip of the cup 200. With the carriage stopped momentarily, the microprocessor reactivates the blade motor 34 for approximately 0.5 seconds (step 326), causing the blade to spin and fling any remaining milkshake ingredients off the blade and back into the cup below its upper lip. At step 328, which occurs after the reactivation of the blade motor 34, the carriage motor 32 is instructed to move the carriage 44 and blade 76 into their original positions above the cup 200. Finally, at step 330, the microprocessor 35 causes deactivation of the solenoid latch 103, causing plunger 105 to move to the unlatched position shown in FIG. 10, allowing the cup housing 16 to be opened by a user.

The present invention has been described with respect to two embodiments, one which utilizes a blender and another which utilizes a frozen drink machine. It should be appreciated, however, that many modifications may be made to the described embodiments without departing from the scope of the invention. For example, the method as described with respect to each embodiment maybe carried out using a frozen substance that is pre-aerated or one that is not pre-aerated. Additionally, the method of the invention may be practiced using equipment other than that described herein. Accordingly, Applicant's invention should be limited only in terms of the appended claims and should not be restricted by the described embodiments.

What is claimed is:

1. An apparatus for making a frozen drink from a block of frozen substance in a cup, the substance frozen to substantially conform to the interior of the cup, and the cup having a vertical axis, wherein the apparatus comprises:
   a cup support for receiving the cup and inhibiting rotation of the cup;
   an agitator which, when a cup containing a block of frozen substance is positioned on the cup support, is extendable coaxially into the cup to grind the block of frozen substance in the cup into a ground frozen substance; and
   a liquid dispenser which is configured to direct heated liquid into the cup in the cup support.

2. The apparatus of claim 1 wherein the agitator comprises a rotatable blade assembly aligned for selected coaxial extension into a cup positioned in the cup support.

3. The apparatus of claim 2, and further comprising:
   an initiation switch;
   a controller for generating up and down blade movement control signals and blade rotation control signals;
   a slidable and rotatable shaft attached to the blade assembly and moveable between upper and lower positions corresponding to upper and lower blade positions; and
   first and second motors coupled to the shaft, the first motor responsive to the blade movement control signals to move the shaft between the upper and lower positions, the second motor responsive to the blade rotation control signals to rotate the blade assembly, the controller responsive to activation of the initiation switch to allow the blade assembly to rotate and to be lowered into a cup when a user activates the initiation switch.

4. The apparatus of claim 3, further comprising:
   a cup sensor for detecting the presence of a cup in the cup support and for producing an output,
   wherein the controller is responsive to the output of the cup sensor to allow the blade assembly to rotate and to be lowered into a cup when a cup is detected in the cup support.

5. The apparatus of claim 1 wherein the liquid dispenser directs heated liquid into the cup during at least a portion of the grinding of the frozen substance by the agitator.

6. The apparatus of claim 5 wherein the heated liquid and the agitator simultaneously engage the block of frozen substance in the cup.

7. The apparatus of claim 1 wherein the agitator and cup are moveable relative to one another between first and second positions, the first position having the agitator within the cup and in contact with the block of frozen substance in the cup and the second position having the agitator spaced from the cup.

8. The apparatus of claim 7, and further comprising a process controller operable for effecting movement between the first and second positions.

9. The apparatus of claim 1, and further comprising a heater which heats the liquid to at least approximately 100° F.

10. The apparatus of claim 9 wherein the liquid is heated to at least approximately 170° F.

11. The apparatus of claim 10 wherein the liquid is heated to at least approximately 180° F.

12. The apparatus of claim 1 wherein the dispenser directs a predetermined amount of heated liquid into the cup in the cup support.

13. The apparatus of claim 12 wherein the predetermined amount of heated liquid is about 3 ounces.

14. The apparatus of claim 12 wherein the ratio of the predetermined amount of heated liquid to frozen substance in the cup, by volume, is about 3:10.

15. The apparatus of claim 12 wherein the ratio of the predetermined amount of heated liquid to a size of the cup, by volume, is about 3:16.

16. The apparatus of claim 1 wherein the volume of the block of frozen substance in the cup is approximately 60% of the total volume of the cup.

17. The apparatus of claim 1 wherein the dispenser directs heated liquid into the cup in the cup support for a predetermined time period.

18. The apparatus of claim 17 wherein the time period is from approximately three to approximately five seconds.

19. The apparatus of claim 1 wherein the dispenser begins directing heated liquid into the cup approximately when grinding of the frozen substance in the cup begins.

20. The apparatus of claim 1 wherein the dispenser begins directing heated liquid into the cup approximately when the agitator first contacts the block of frozen substance in the cup.

21. The apparatus of claim 1 wherein the agitator includes an aerator for causing air to be incorporated into the ground frozen substance by the rotatable blade.

22. The apparatus of claim 21 wherein the ratio between the volume of incorporated air and the total volume of the frozen drink is about 3:16.

23. The apparatus of claim 1, and further comprising:
a cup sensor for detecting a characteristic of a cup in the cup support and for producing an output corresponding to the characteristic of the cup; and
a controller for generating a process control signal which corresponds to the output produced by the cup sensor.

24. The apparatus of claim 23 wherein the characteristic is the size of the cup.

25. The apparatus of claim 24, wherein the liquid dispenser is responsive to the process control signal to a dispense a volume of liquid into the cup, the volume corresponding to the size of the cup.

26. The apparatus of claim 24, and further comprising:
an agitator assembly being responsive to the process control signal to move the agitator vertically, the extent of movement corresponding to the size of the cup.

27. The apparatus of claim 1, and further comprising:
an enclosure which encloses the cup in the cup support so that the cup is inaccessible during grinding of the frozen substance therein by the agitator.

28. The apparatus of claim 27, and further comprising:
an enclosure sensor for detecting whether the enclosure is in an open or closed position and for producing an output indicating whether the enclosure is in an open or closed position; and
a controller for generating agitator control signals, the controller being responsive to the enclosure sensor output, the controller allowing for agitator operation only if the sensor output indicates that the enclosure is in a closed position.

29. The apparatus of claim 28 wherein agitator operation includes extending the agitator coaxially down into the cup and retracting the agitator coaxially up relative to the cup.

30. The apparatus of claim 29 wherein the agitator includes a blade, and wherein operation of the agitator further includes rotating the blade.

31. The apparatus of claim 30 wherein the agitator is movable down and up a second time during grinding of the frozen substance.

32. The apparatus of claim 31 wherein the agitator is movable coaxially up out of the cup.

33. The apparatus of claim 1, and further comprising an enclosure which encloses the cup in the cup support so that the cup is inaccessible during dispensing of the heated liquid into the cup.

34. An apparatus for making a milkshake or smoothie in a cup containing milkshake or smoothie ingredients frozen into a block which conforms to an interior shape of the cup, the apparatus comprising:
a cup holder for non-rotatably receiving the cup, the cup having a vertical axis;
a rotatable blade aligned relative to the cup holder to have a first raised position remote from an open top end of the cup and a second lowered position wherein the blade is in engagement with the ingredients inside the cup, the movement of the blade being along the vertical axis of the cup;
a mix motor operably coupled to the blade to rotate the blade;
a drive motor operably coupled to change the relative blade and cup positions between the first and second positions;
a source of liquid heated to at least approximately 100° F.; and
a liquid dispenser disposed over an opening at a top end of the cup in the cup holder, the dispenser being in fluid communication with the source and aligned for adding a predetermined portion of the heated liquid into the cup to be mixed with the ingredients therein by the rotatable blade.

35. The apparatus of claim 34 wherein the rotatable blade is in the lowered position when the heated liquid is added.

36. The apparatus of claim 34 wherein the liquid is heated to at least approximately 170° F.

37. The apparatus of claim 34 wherein the dispenser begins adding heated liquid into the cup approximately when rotation of the blade begins.

38. The apparatus of claim 34, and further comprising:
an enclosure which encloses the cup in the cup holder so that the cup is inaccessible during mixing of the liquid and the frozen ingredients therein by the rotatable blade.

39. The apparatus of claim 38, and further comprising:
an enclosure sensor for detecting whether the enclosure is in an open or closed position and for producing an output indicating whether the enclosure is in an open or closed position; and
a controller for generating blade operation signals, the controller being responsive to the enclosure sensor output, the controller allowing for blade operation only if the sensor output indicates that the enclosure is in a closed position.

40. The apparatus of claim 34, and further comprising an enclosure which encloses the cup in the cup holder so that the cup is inaccessible during adding of the heated liquid into the cup.

41. An apparatus for making frozen drinks from a frozen substance in a cup, wherein the substance is frozen to substantially conform to an interior of the cup, the apparatus comprising:
a cup support for receiving the cup and inhibiting rotation of the cup, the cup having a vertical axis;

a rotatable blade assembly including shaving elements and aeration elements, the blade assembly moveable along the vertical axis between upper and lower blade positions, the lower blade position being at a height such that when a cup is positioned in the cup support, the blade assembly is positioned within the cup and adjacent to a bottom of the cup;

a source of heated liquid; and a pump configured to direct heated liquid from the source thereof into a cup containing a frozen substance when the cup is positioned in the cup support.

42. The apparatus of claim 41 wherein the heated liquid and the rotatable blade assembly simultaneously engage the frozen substance in the cup.

43. The apparatus of claim 41, and further comprising a heater which heats the liquid to at least approximately 100° F.

44. The apparatus of claim 41, and further comprising:

a cup sensor for detecting a characteristic of a cup in the cup support and for producing an output corresponding to the characteristic of the cup; and a controller for generating a process control signal which corresponds to the output produced by the cup sensor.

45. The apparatus of claim 44 wherein the characteristic is the size of the cup.

46. The apparatus of claim 45, wherein the pump is responsive to the process control signal to a dispense a volume of liquid into the cup, the volume corresponding to the size of the cup.

47. The apparatus of claim 41, and further comprising an enclosure which encloses the cup in the cup support so that the cup is inaccessible during pumping of the heated liquid into the cup.

48. An apparatus for making a frozen drink from a frozen substance in a cup, wherein the substance is frozen to substantially conform to the interior of the cup, the apparatus comprising:

a housing;

a cup support mounted to the housing, the cup support inhibiting rotation of the cup;

a liquid dispenser having an outlet positioned to direct a predetermined amount of heated liquid into a cup positioned on the cup support; and a shaft mounted to the housing, the shaft carrying a rotatable blade having shaving elements and aeration elements thereon, the shaft moveable relative to the housing to carry the blade between an upper blade position remote from the cup support and a lower blade position adjacent to the cup support, the rotatable blade configured to, when it is lowered into a cup containing frozen substance, shave the frozen substance, mix the frozen substance with heated liquid dispensed by the liquid dispenser, and incorporate air into the resultant mixture of frozen substance and heated liquid.

49. The apparatus of claim 48 wherein the heated liquid and the blade simultaneously engage the frozen substance in the cup.

50. The apparatus of claim 48, and further comprising a heater which heats the liquid to at least approximately 100° F.

51. The apparatus of claim 48 wherein the dispenser begins directing heated liquid into the cup approximately when shaving of the frozen substance in the cup begins.

52. The apparatus of claim 48 wherein the dispenser begins directing heated liquid into the cup approximately when the blade first contacts the frozen substance in the cup.

53. The apparatus of claim 48, and further comprising an enclosure on the housing which encloses the cup in the cup support so that the cup is inaccessible during dispensing of the heated liquid into the cup.

* * * * *